United States Patent
Valery et al.

(10) Patent No.: US 6,324,295 B1
(45) Date of Patent: Nov. 27, 2001

(54) GUIDING METHOD AND DEVICE FOR IN-FLIGHT-REFUELLING LINE

(75) Inventors: Philippe Valery; Hubert Wassner, both of Bordeaux; Patrice Horaud, La Tronche, all of (FR)

(73) Assignees: Sextant Avionique, Velizy (FR); Institut National Polytechnique de Grenoble, Grenoble (FR)

( * ) Notice: Subject to any disclaimer, the term of this patent is extended or adjusted under 35 U.S.C. 154(b) by 0 days.

(21) Appl. No.: 09/180,280
(22) PCT Filed: May 7, 1997
(86) PCT No.: PCT/FR97/00823
  § 371 Date: Nov. 10, 1998
  § 102(e) Date: Nov. 10, 1998
(87) PCT Pub. No.: WO97/43180
  PCT Pub. Date: Nov. 20, 1997

(30) Foreign Application Priority Data

May 10, 1996 (FR) .................................................. 96 05844

(51) Int. Cl.$^7$ .................................................. G06K 9/00
(52) U.S. Cl. ............................................ 382/100; 701/300
(58) Field of Search ........................... 364/460; 244/135; 141/232; 382/100; 701/300

(56) References Cited

U.S. PATENT DOCUMENTS

| H297 | * | 7/1987 | Schultz | 141/232 |
|---|---|---|---|---|
| 4,158,885 | * | 6/1979 | Neuberger | 364/460 |
| 4,298,176 | * | 11/1981 | Kendall | 244/135 |
| 4,890,918 | * | 1/1990 | Monford | 356/150 |
| 5,109,345 | * | 4/1992 | Dabney et al. | 364/455 |
| 5,499,784 | * | 3/1996 | Crabere et al. | 244/135 |
| 5,530,650 | * | 6/1996 | Biferno et al. | 364/460 |
| 5,906,336 | * | 5/1999 | Eckstein | 244/135 |

FOREIGN PATENT DOCUMENTS

WO 96/09207 * 3/1996 (WO).

* cited by examiner

Primary Examiner—Joseph Mancuso
Assistant Examiner—Abolfazl Tabatabai
(74) Attorney, Agent, or Firm—Oblon, Spivak, McClelland, Maier & Neustadt, P.C.

(57) ABSTRACT

The invention relates to the in-flight refuelling of aircraft.

To facilitate coupling between a refuelling line carried by an orientable boom at the rear of a tanker aircraft and a coupling receptacle on a receiving aircraft, means of automatic guidance are provided, which comprise:

- a camera (40) borne by the end of the boom and providing an image in the form of an electronic signal,
- shape-recognition means (56, 58, 60) coupled to the camera for recognizing, in the image provided by the camera, characteristic elements associated with the receptacle,
- position-calculation means for determining, by calculation in the image provided by the camera, the difference between the position of the characteristic elements or the image at a given instant and a reference position originating from an image, stored in memory, of the line and of the receptacle when they are coupled,
- means (62) for deducing from the actual size of the receptacle, from the size and from the position of its projection in the image, the depth-wise distance between the end of the line and receptacle,
- and means for controlling the orientation of the boom and deploying the line on the basis of the differences thus determined, so that the line is brought closer to the receptacle by iteration until these differences have been cancelled.

4 Claims, 5 Drawing Sheets

GUIDING METHOD AND DEVICE FOR IN-FLIGHT-REFUELLING LINE

CROSS-REFERENCE TO RELATED APPLICATIONS

This application is related to and claims priority, under 37 C.F.R. §119, from French Patent Application No. 96-05844, filed on May 10, 1996, the entire contents of which is hereby incorporated by reference herein.

BACKGROUND OF THE INVENTION

1. Field of the Invention

The present invention relates to systems for the in-flight refuelling of aircraft.

2. Discussion of Background

In-flight refuelling consists in transferring fuel from a tanker aircraft to a receiver aircraft using a hose which passes through what is commonly known as a boom and a telescopic line extending from this boom. The boom is fixed to the lower rear part of the fuselage of the tanker aircraft by a semi-rigid connection which allows it a certain freedom of movement. The boom and line assembly floats up under the empennage of the tanker aircraft by virtue of ailerons equipped with control surface which allow it to be steered. The total length of the boom and deployed line assembly may be as much as 15 or 20 meters. The receiver aircraft has a receptacle intended to receive the end of the line during refuelling. This receptacle is equipped with locking means for holding the line in place in relation to a pipe which allows the file from the tanker aircraft to be taken into a tank of the receiver aircraft.

The pilot of the receiver aircraft needs to bring his airplane up under the empennage of the tanker aircraft near to the line that extends behind the tanker aircraft, and keep his speed strictly identical to that of the tanker aircraft until the end of the refuelling operation.

The pilot of the receiver aircraft needs to bring his aeroplane up under the empennage of the tanker aircraft near to the line that extends behind the latter, and keep his speed strictly identical to that of the tanker aircraft until the end of the refuelling operation.

There are two ways of connecting the tanks of the tanker aircraft and of the receiver aircraft.

In the first case, the receiver aircraft is equipped with an in-flight refuelling line which extends in the field of view of the pilot, and the hose from the fuel tank of the tanker aircraft extends beyond the boom and the line in the form of a "basket" intended to receive the line of the receiver aircraft. It is therefore the pilot of the receiver aircraft who has to steer his airplane in such a way as to lock his line in the bottom of the basket.

In the second case, to which the present invention is more specifically related, the receiver aircraft is equipped only with a refuelling receptacle, and it is the end of the line from the tanker aircraft which is docked in the receptacle to allow fuel to be transferred. The line is guided by an operator placed in the rear of the tanker aircraft. This operator looks out through a window and performs the operations of coupling the two aircraft so that fuel can be transferred. To do this, the operator has control levers which operate servomotors that steer the boom so that the rear end of the boom/line assembly can be brought up close to the receptacle placed on the receiver aircraft. The position of this receptacle is identified by a painted mark on the aircraft skin. When the line is in the desired position, facing the receptacle, the operator initiates an additional deployment of the end of the telescopic line, and this engages and locks the line in the receptacle. Fuel transfer can then take place. Guiding the line towards the receptacle of the receiver aircraft is a tricky operation because of the relative movements of the two aircraft and of the boom, and because the control surfaces are extremely sensitive at the normal working altitudes and speeds. The operator has to operate the boom controls very gradually, and the time needed to make the connection between the line and the receptacle may be great (i.e., as much as a few minutes), especially if the surrounding air is turbulent.

SUMMARY OF THE INVENTION

For various reasons, it may be desirable for the operations to be performed without using an operator placed in the rear of the tanker aircraft.

An object of the present invention is therefore to design a system which allows the coupling operations to be performed without an operator placed in the rear of the tanker aircraft.

Another object of the present invention is to reduce the time needed to couple the line and the receptacle and thus, increase the refuelling rotation.

One idea might be to use two video cameras placed one on each side of the aircraft. These cameras, which would observe the refuelling scene from two different angles, would allow the objects in the scene to be reconstructed in three dimensions. From this, the coordinates of the receptacle and of the end of the line could be deduced in a three-dimensional (3D) reference frame.

However, although this solution is envisageable for robotic applications in an industrial environment, it becomes extremely complicated to employ on an in-flight refuelling aircraft with the operating constraints involved, and this makes its performance uncertain.

One of the difficulties is that of locking on to and tracking two objects of the image which move independently causing these objects to be obscured. Another difficulty arises from the use of variable focal length cameras. This type of equipment is needed in order to be able to guarantee that both objects will be present in the images simultaneously, even taking account of any possible turbulence, and so as to allow a good level of accuracy in extracting their co-ordinates in three dimensions, particularly in the final phase of guiding the line onto the receptacle.

The use of two variable focal length cameras intended to perform a three-dimensional reconstruction is extremely complicated because it entails instantaneous and precise knowledge of the focal lengths, and requires the optical axes of the two cameras to be automatically controlled as a function of their focal length; this then entails them being installed on platforms which, given the ambient environment and the temperatures imposed by the high altitude (of the order of −55° C.), is not simple.

The present invention aims to provide a solution which is simpler to implement than this two-camera solution.

According to the present invention, a coupling system has been proposed, particularly for in-flight refuelling, using means for automatically guiding the end of a line towards a coupling receptacle with a view to coupling the line and this receptacle, the line being deployable from one end of an orientable boom, the coupling system including:

a camera borne by the end of the boom and providing an image in the form of an electronic signal;

shape-recognition means coupled to the camera for recognizing, in the image provided by the camera, characteristic elements associated with the receptacle;

position-calculation means for determining, by calculation in the image provided by the camera, the difference between the position of the characteristic elements of the image at a given instant and a reference position originating from an image, stored in memory, of the line and of the receptacle when they are coupled;

means for deducing from the actual size of the receptacle, from the size and from the position of its projection in the image, the depth-wise distance between the end of the line and the receptacle; and means for controlling the orientation of the boom and deploying the line on the basis of the differences thus measured, so that the line is brought closer to the receptacle by iteration until these differences have been canceled.

Thus, the idea proposed by the present invention is to place one camera on the boom, towards its rear end, and therefore close enough to the receptacle that is to be observed, to use the image produced to perform shape recognition and take distance measurements in the plane of the image, and to add to this the prior knowledge of the theoretical configuration of characteristic elements of the receptacle (or of an associated painted mark) in order to evaluate the distance between the line and the receptacle along the depth axis.

The guidance principle will then be to minimize these distances by iteration, that is to say, to use automatic speed control to gather onto a reference image.

Although it would be natural to use cameras which are as distant as possible from e axis of the line, and therefore, in practical terms, cameras mounted on the tanker aircraft, in order to get a better view and better measure of the distance in three dimensions between the end of the line and the receptacle, the present invention proposes a different solution using a camera mounted on the boom. This configuration avoids having to operate in an absolute three-dimensional (3D) reference frame, because only the relative movements of the receptacle, with respect to the boom, are observed. It should also be noted that positioning the camera on the boom shows the telescopic line in the image. This point could be a handicap insofar as there is the risk, in some instances, that the line may conceal some (or even aft) of the characteristic elements associated with the receptacle. It has been found that this drawback is only a small impediment because the camera is stationary with respect to the boom, which means that the area of the image covered by the telescopic line is perfectly predictable.

The present invention proposes to fix the camera or cameras to the boom, close to its end, that is to say, securely at the end of the guidance mechanism. The advantages are numerous. Mention may be made of the positioning of the camera in a region close to the target to be reached, the converging movement of the boom towards the receptacle during the refuelling phase, which limits the risk of leaving the field of view of the camera and which also limits the number of objects present in the images. The camera will therefore be able to be guided with a fixed focal length, which significantly simplifies the use of the method adopted The system will be used with a computer which is powerful enough to perform shape recognition and tracking using digital image processing. This computer, on board the tanker aircraft, will use a database, in which the characteristic elements of the various receptacles and paint markings used on the aircraft likely to be refueled, are stored. Guidance using this imaging system actually depends on a process of recognizing characteristic elements associated with the receptacle It is desirable that the automatic system should fit in with the markings already used or be able to be used for aircraft bearing different markings or receptacle.

BRIEF DESCRIPTION OF THE DRAWINGS

Other characteristics and advantages of the present invention will emerge from reading the detailed description which follows, and which is given with reference to the appended drawings, in which.

DETAILED DESCRIPTION OF THE PREFERRED EMBODIMENTS

Figure 1:
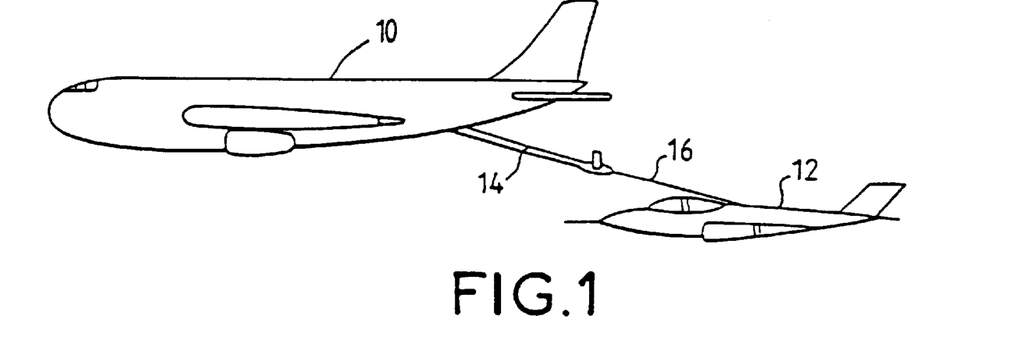
FIG. 1 is an overall side elevational view of a tanker aircraft coupled to a receiver aircraft.

FIG. 1 diagrammatically depicts a tanker aircraft 10 and a receiver aircraft 12 being refueled in flight. The in-flight refuelling system is made up of a boom 14 extended by a telescopic line 16. It extends under the rear part of the fuselage of the tanker aircraft. The boom 14 is rigid and orientable with respect to the longitudinal axis of the aircraft, while pointing generally backwardly and downwardly. With respect to the longitudinal axis of the aircraft, it may, for example, be inclined downwardly in an angular sector extending from 20° up to 40°, and laterally from 0° to 10° or 15° on each side of the axis. It may, for example, be 5 to 10 meters long and it is extended by a telescopic line 16 which can extend over a length of a few meters. For example, the total length of the boom and of the line may vary between 15 and 20 meters. The connection between the boom and the rear of the aircraft is a semi-rigid connection using a ball joint, and the boom is oriented with respect to the axis by means of mobile ailerons controlled by servomotors. The servomotors are operated from the tanker aircraft.

In the example described, the boom is steered by ailerons arranged in a V-shaped arrangement, but another arrangement of these ailerons (in a T-shaped arrangement, for example) is envisionable. The boom is therefore steered in the same well-known way as an aircraft empennage with an equivalent architecture. The principle underlying the present invention is independent of the way in which steering is achieved.

The telescopic extension of the line is also controlled from the aircraft and may possibly be measured by telemetry inside the telescopic line.

Figure 2:
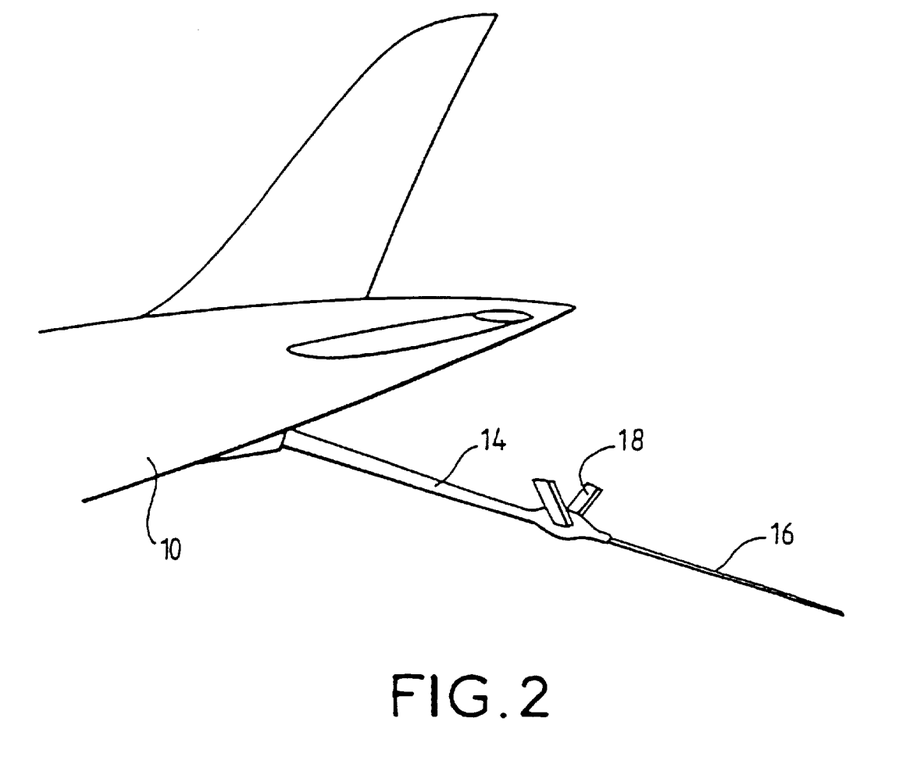
FIG. 2 is, in greater detail, a partial side elevational view of the tail of the tanker aircraft with its orientable rear boom.
Figure 3:
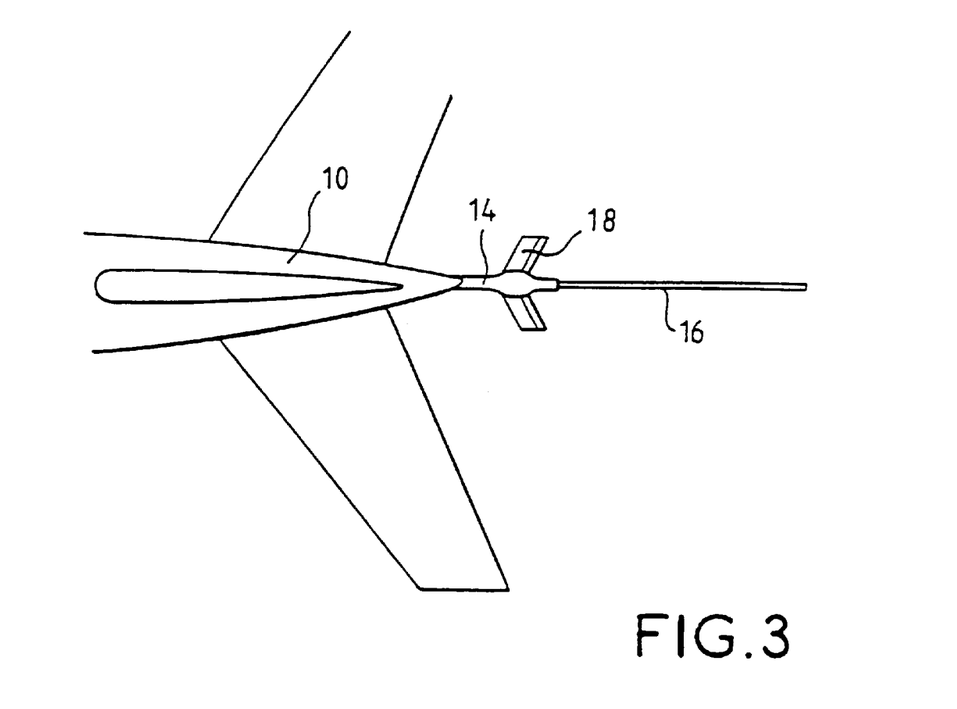
FIG. 3 is a plan view corresponding to FIG. 2.

FIGS. 2 and 3 depict, in greater detail, a view of the boom 14 with its telescopic line 16 and its ailerons 18. The ailerons Is are, for example, two ailerons 18 arranged in a V-shaped configuration and include moving parts (the entire aileron might be moveable) controlled in such a way as to alter the life of each one and thus alter the lateral and vertical inclination of the boom. It is this inclination, coupled with a choice of telescopic extension of the line, which allows the end of the line to be positioned exactly with respect to a receptacle provided on the receiver aircraft, while the receiver aircraft is very closely following the tanker aircraft at the same speed as lie tanker aircraft.

In the prior-art technique, positioning was done by hand and by an operator placed in the rear of the tanker aircraft. The operator operates control levers and watches directly, through a transparent window, the result of his maneuvers until he precisely positions the end of the line so that it faces the receptacle of the receiver aircraft.

Figure 4:
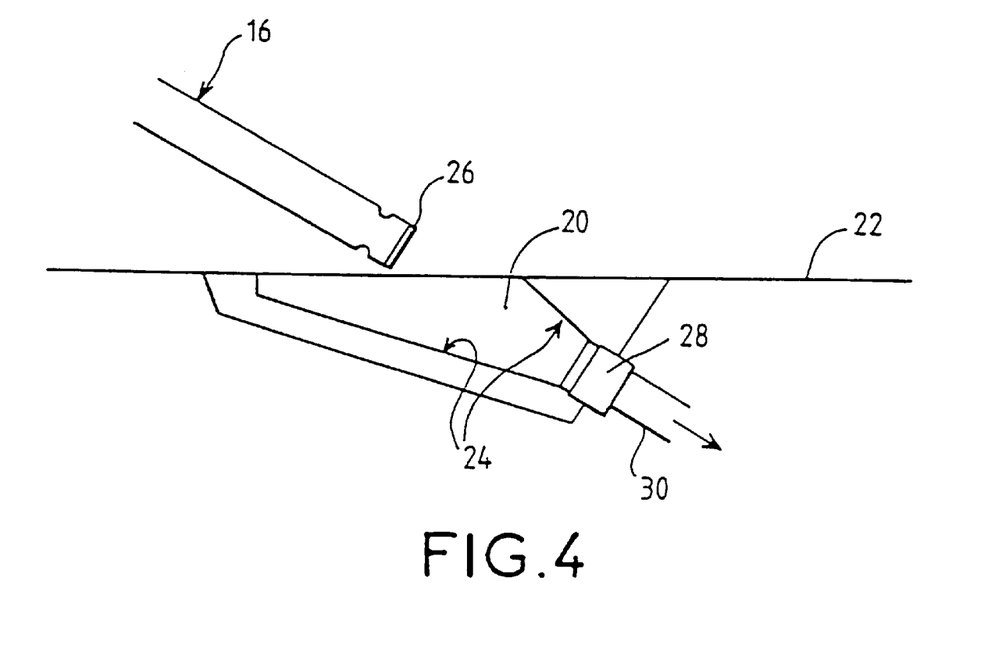
FIG. 4 is a diagrammatic cross-sectional view of the receptacle placed on the receiver aircraft, capable of receiving the end of the line from the tanker aircraft.

FIG. 4 depicts, diagrammatically in cross-section, the coupling receptacle designed to receive the refuelling line. The receptacle 20 is arranged flush with the skin 22 of the aircraft fuselage. It preferably includes an inlet housing, with walls 24 which are generally conical or pyramid-shaped narrowing towards the inside, so that the end 26 of the line 16 is naturally guided, as it enters the housing, towards the bottom of the housing in which the actual coupling device 28 is located. The guidance by the walls 24 is such that the end of the line naturally engages in the coupling device 28 once it is in place opposite the receptacle and an additional action to deploy the line telescopically, by a few centimeters or tens of centimeters, is performed. The coupling device 28 allows the line to be held in place during the fuel transfer operation. This device 28 is connected, inside the receiver aircraft, by a pipe 30 to a fuel tank (not shown).

Figure 5:
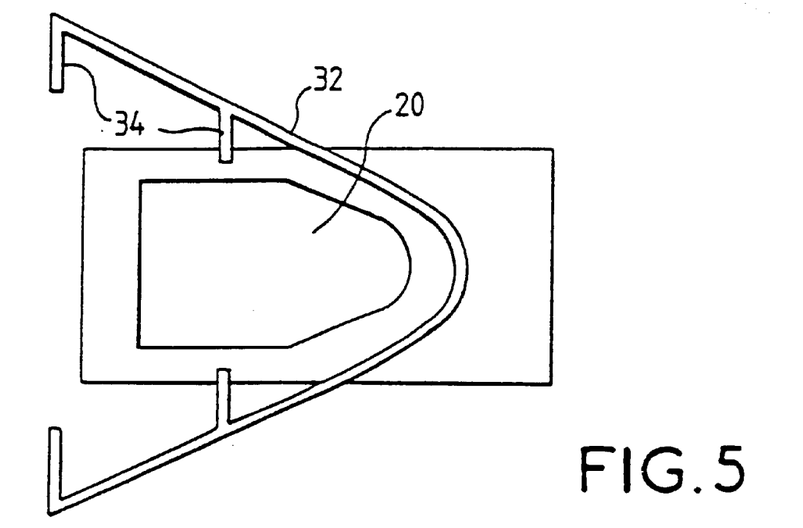
FIG. 5 is a plan view of the receptacle and of the characteristic paint mark which marks its precise position.

FIG. 5 is a plan view of the receptacle 20 flush with the surface of the aircraft. To make it easier for the operator to position the end of the line, the exact position of the receptacle may be emphasized by a making (paint for example). The operator, acting manually wit direct sight, can use this marking to help check that the line is in the correct position before deploying a little more line, which will allow this line to lock in the receptacle. In the sample depicted, the marking 32 is a roughly triangular shape surrounding the receptacle, with edges 34 running at right angles to the axis of the aircraft. This marking is merely one example.

The present invention proposes an automatic guidance system, but not as a substitute for manual guidance, which means that a receiver aircraft can be coupled with equal preference to a tanker aircraft, fitted with automatic guidance means, or to a tanker aircraft, which does not have automatic means. This is why the present invention preferably uses the same marking as are currently used on existing refuellable aircraft.

Figure 6:
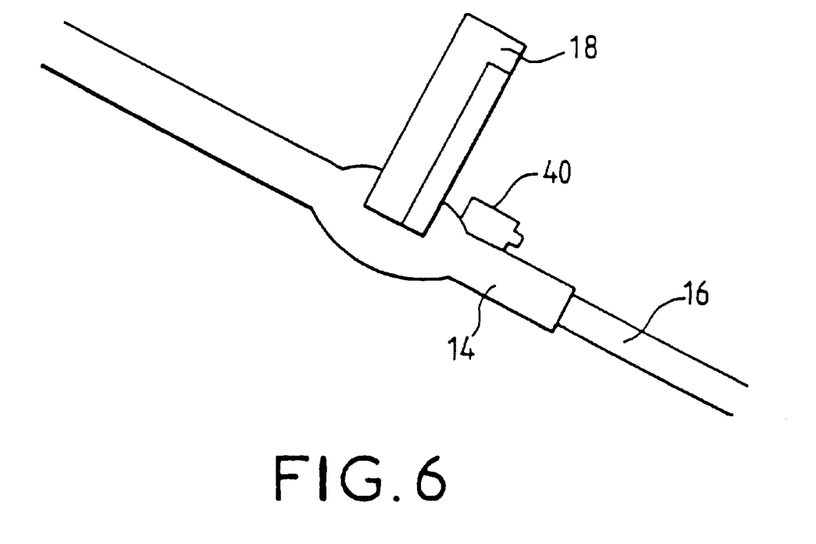
FIG. 6 is a diagrammatic side elevational view showing the mounting of the camera on the boom.

The automatic guidance uses image shape recognition, from the image provided by a camera (visible or possibly, infrared). According to the present invention, as shown in FIG. 6 the camera 40 is mounted at the end of the boom 14, for example, behind the ailerons 18. In theory, just one camera will suffice, but it will be seen that it is also possible to use two cameras, for example, one on each side of the boom, or one above and one below, or alternatively, two cameras placed on top of the boom, very close together because they are both on the boom, but one offset to the right and the other offset to the left.

Figure 7:
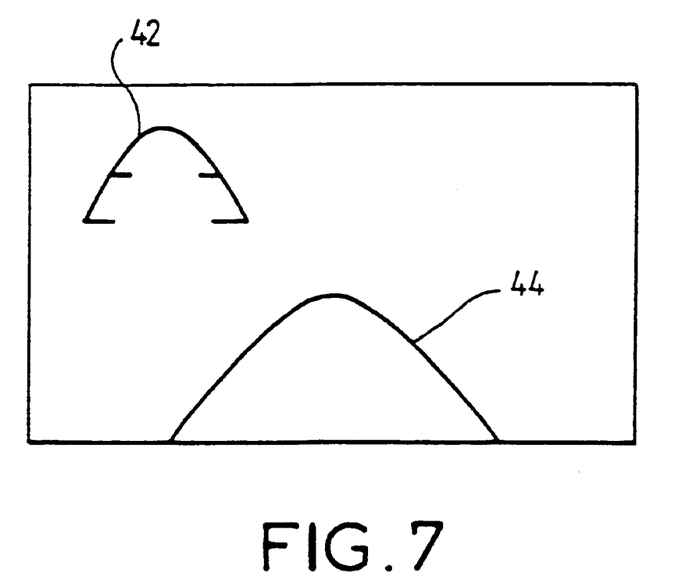
FIG. 7 is a diagrammatically depiction of an image provided by the camera during the approach with a view to automatic coupling.

FIG. 7 depicts an image recorded by the camera 40 as the end of the line approaches the receptacle.

The image 44, of the hose 14, is very deformed because the line of sight of the camera is practically parallel to the telescopic line.

Because of the geometry adopted for the system, the projection of the line in the image is a trapezium which covers the lower part of the image. By choosing a line of sight which diverges slightly from the axis of the line it is possible to minimize the area of the image covered by the line. The other consequence of this geometry is that the height of the trapezium varies little with the length of line deployed, and this information can even be used to estimate the length of line deployed. This length may also be obtained by any other system (feedback of information from the deployment servomotors, telemetry, etc.).

The system is therefore capable at every instant of knowing the exact shape of the projection of the line in the image.

The image of the receptacle may be emphasized by a contrasting paint mark which allows it to be identified. For simplicity, it will be assumed that the paint mark represents the precise position of the receptacle, which it does if it closely surrounds the receptacle. However, it will be understood that the identification mark could be situated further away from the receptacle, the position calculation then having to take account of the distance between this mark and the receptacle because the guidance calculation is performed with respect to the mark even though the guidance operation consists in moving up close to the receptacle. It may be advantageous to use a mark spaced away from the receptacle so that there is less risk of the image of the mark being obscured by the line itself.

The image 42 of the paint mark 32 is deformed compared with the horizontal image of FIG. 5 because the camera is looking down at an angle (theoretically, the boom is inclined obliquely downwardly, the camera being oriented parallel to the boom, whereas the plane of the mark is generally horizontal).

Figure 8:
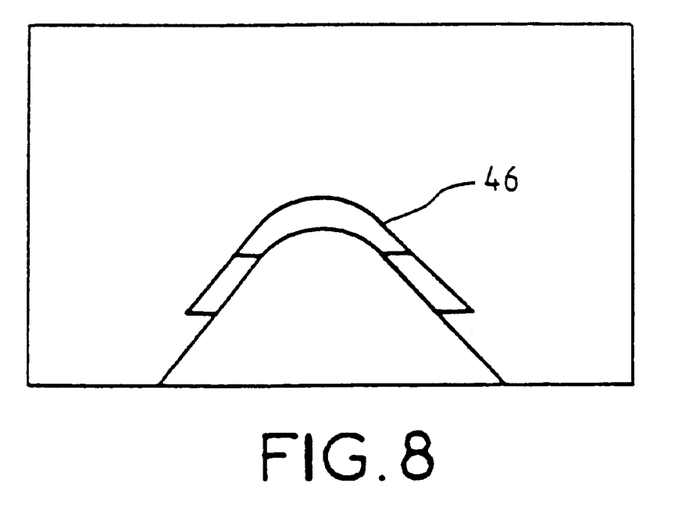
FIG. 8 is a final image obtained by the camera when the line is in position ready for coupling.

FIG. 8 depicts the final image 46 of the pain mark as the camera needs to see it at the moment the line is ready for coupling. This final image 46 obviously depends on the mark used. The final image of the mark is at a clearly determined reference position in the image, and has a clearly determined size. But remember, this final image, its reference position and its reference size are not absolute: they depend on the deployed length of line and on the orientation of the boom with respect to the horizontal, so it will be understood, for example, that if there is a long length of line deployed between the camera and the receptacle, then the image of the paint mark will have to seem smaller than if a short length is deployed. Likewise, if the boom is inclined more steeply in the vertical or lateral plane, the projection of the paint mark onto the plane of the image will not be the same as if the inclination were shallower.

The function of the calculation circuits is to compare the detected image 42 with the reference image, and therefrom deduce the guidance controls to be applied to the boom ailerons and the deployment controls to be applied to the line servomotors in a sense that will tend to make the image 42 of the paint mark coincide with the reference image that corresponds to the position suitable for coupling.

It will have been understood that coincidence entails that the detected position of the receptacle and the size of the characteristic elements correspond to those of the reference image.

FIGS. 7 and 8 depict diagrammatic images rather than the landscape actually recorded by the camera. However, in any event, positioning the camera on the boom makes it possible to work with simple images because the proximity of the camera to the receiver aircraft limits the number of objects present in the field of view of the camera. This makes it possible to simplify the shape-recognition operations which allow automatic control using a recognized shape and a reference shape.

The digital signal processing used in the present invention therefore includes at least the following steps:

filtering the images from the camera;

extracting the characteristics (point elements or contours or homogeneous regions, etc.), recognizing a reference shape in the image;

measuring differences in position in the image plane between the detected shape and the reference shape;

coordinating signals for shifting the boom and the line in a direction which tends to bring the detected shape closer to the reference shape, in terms of position and in terms of size;

continuing to measure the differences in position and to compare the sizes if coincidence is not achieved, or detecting coincidence in terms of position and in terms of size; and authorizing coupling when coincidence is detected.

Figure 9:
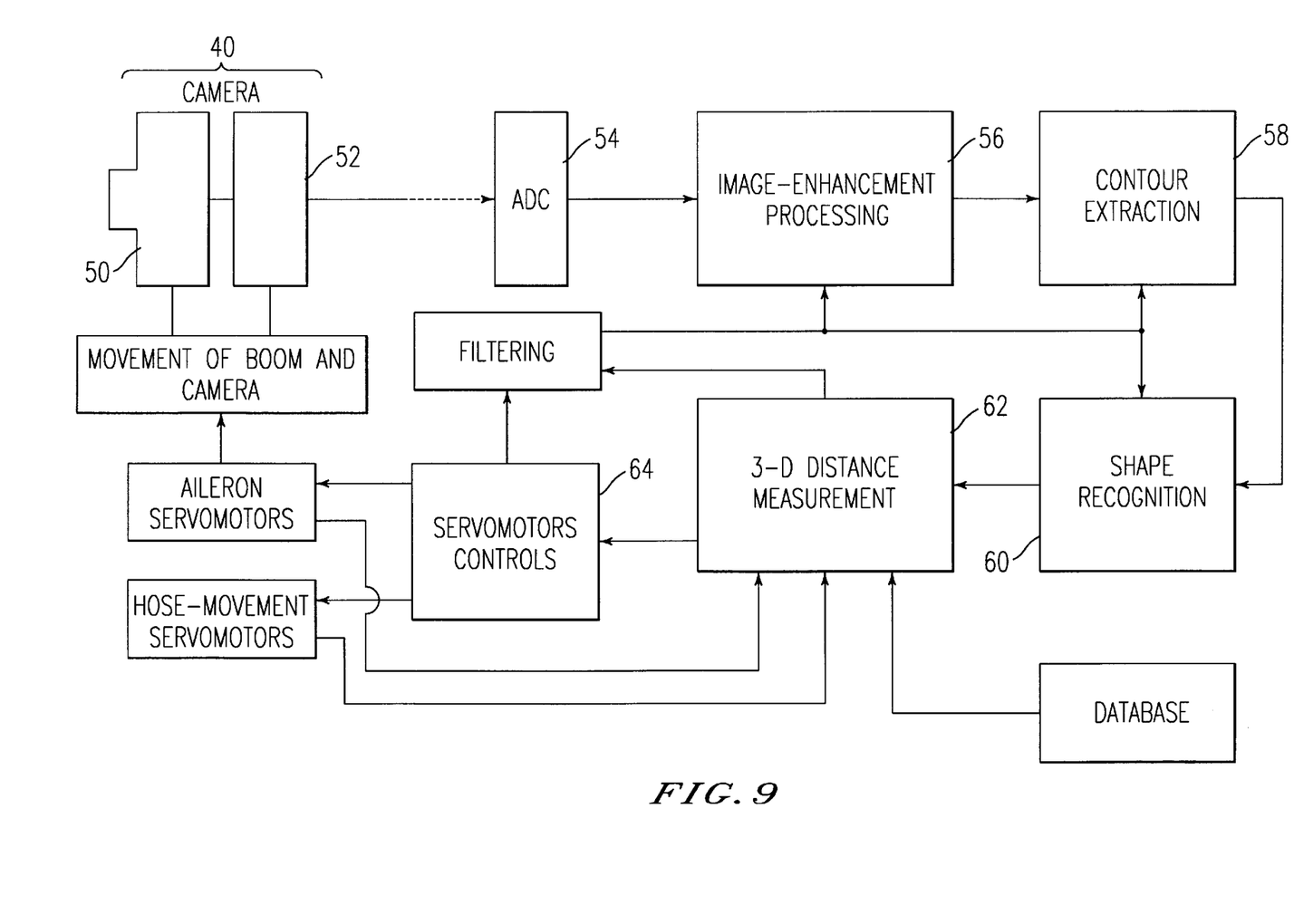
FIG. 9 is an overall diagram of the guidance system according to the present invention.

FIG. 9 depicts the overall construction of the system according to the present invention, and the functions which may be employed to obtain optimal functioning of die present invention will now be explained in greater detail.

The camera 40 includes, as cameras always do, an optical head 50 and electronic circuits 52 for control and for shaping raw electrical signals.

The video signal, provided by the camera 40, is transmitted to the tanker aircraft and is exploited by a digital computer. The functions performed by this computer have been detailed, for reasons of convenience, in the form of blocks strung together in series in FIG. 9.

The computer receives the signals from the camera and converts them into digital in an analogue-digital converter 54 (unless the signal has already been digitized inside the camera). The digitized image signals are then processed as follows.

Digital image enhancement processing (block 56) makes it possible to work on an image which has been corrected for fixed or periodic defects originating from the camera, and to reduce noise. To carry out these pre-processing operations, an array of correction operators may be used, depending on the image quality. These may include radiometric and homogeneity corrections aimed at reducing the phenomena of distortion or degradation of the grey levels, geometric corrections, image averaging (3 by 3, for example) or Gaussian or median filtering to reduce high-frequency noise. A reference image of the fixed defects may also be subtracted from the images originating from the camera (to reduce low-frequency noise).

After this digital filtering, the signals are processed in a contour detection block which allows the image to be replaced with contours to make subsequent recognition of expected shapes in these lines easier. The contour detection circuit works by measuring contrast. It retains only areas in which there are sharp changes in contrast. If the paint of the specific mark surrounding the receptacle has sharp enough contrast, then, for example, a contour detection threshold, such that only the contour of this mark is kept in the processed image, may be applied.

This block may be supplemented by a function of detecting point elements of the image. This is in order to detect the corners of the shapes of the image. Knowledge of where the corners are in the image is information that allows the shape recognition module to be improved or speeded up. There are two conventional methods that may be mentioned as examples of ways of fulfilling this function. These are Moravek's method or Hessien's calculation. A third friction of detecting the homogeneous regions of the image may also be added. This last Step may, for example, employ Kohler's method. This allows preparation for the shape-recognition phase, by extracting from the image, the useful information it contains, i.e., contours, corners, and homogeneous regions.

Contour detection techniques are now functions which are commonplace in digital image processing and there is no need to go into the details of this únction. Non-specialists wishing to acquaint themselves with the subject may, for example, refer to R. Deriche's article "Using Cany's Criteria to Derive a Recursively Implemented Optimal Edge Detector", International Journal of Computer Vision, 1(2): 167, 1987. The book by William K. Pratt "Digital Image Processing" published by John Wiley and Sons, 1987 also provides an overview of the conventional contour detection elements, and also of the conventional image enhancement processing elements performed prior to this detection. Reference may also be made to the book by R. Horaud and O. Monga entitled "Vision par Ordinateur, Outils Fondamentaux" [Computer Vision, Basic Tools], published by Hermès, Paris 1995, which deals exhaustively with the problem of detecting contours.

The recommended method does not depend on the choice of contour detection method used.

The next stage of the, processing, performed in block 58, is a stage of concatenating the contours obtained. This is needed because contour detection provides isolated points, that is to say, points which are not mathematically linked. It is therefore necessary to concatenate these contour points while incorporating previous knowledge about the objects one is seeking to isolate (continuity of the contour, size, etc.) so as to limit the number of contours of the image which are irrelevant. The contours retained are then encoded using conventional methods, such as: chain code; polygonal approximation; polynomial approximation; and Fourier descriptors.

Non-specialists can also, if they wish to acquaint themselves with this topic, refer to the concatenation method explained by G. Giraudon "An efficient Edge Following Algorithm", Proceedings of the 5th Scandinavian Conference on Image Analysis", Stockholm, pages 547–554, 1987.

The processed image that results from this processing is now in the form of characteristic vectors which can be stored in a memory and used later in the form of vectors rather than as point by point images.

The next processing block is an actual shape-recognition block 60 which allows an image of the receptacle or its associated marking to be recognized within this collection of vectors. This block therefore needs to compare the vectorized contour image detected by the camera, possibly supplemented by the corners and homogeneous regions, with a theoretical model to which this image is supposed to correspond at a given instant.

As the location of the image of the mark in the field of view of the camera is not known and as it is in any case necessary to determine the position of this image if it is recognized, use is preferably made of a recognition principle that employs segment translation.

Here is an overview of the general principle, which is now commonplace, of recognition by segment translation. A search is made for the individual translations that will allow a segment of the detected contour to be superimposed on a corresponding segment of the desired model which has substantially the same orientation. At the detected segment and the segment of the model are not necessarily the same size (especially at the beginning of the guidance phase), there are numerous possible translations that will allow the first segment to be brought onto the second. All of these possible translations may, in fact, be represented by a "translation vector". If a search is made for the translation vectors, that is to say, the sets of possible translations for all the segments of the model that need to be recognized within the image, then a whole set of "translation segments" is obtained and the "translation segments" are all the more tightly grouped, if the detected image indeed resembles the model. These grouped vectors intersect in a region which, statistically, represents an overall translation which is the one most likely to bring a detected contour onto a contour of the model. The very existence of such a probable translation constitutes recognition of the presence of the desired shape in the detected image. Furthermore, the most probable translation makes it possible to define the two-dimensional difference in the detected image, between the position of the recognized shape and the desired theoretical position.

This shape-recognition principle is applied to the contours present in the image processed by the block 58, and these contours are compared with a reference model. The reference model originates from a database which contains various predetermined characteristic images that correspond to the various marks likely to be painted on the aircraft that are to be refueled.

However, in addition, the reference model is not fixed, it changes over time as a function of the orientation of the boom and of the deployed length of line. The shape-recognition block therefore needs, at every instant, to take into account this information regarding the orientation and the length. The reference model for a given length and line orientation is the image of the characteristic elements that the camera sees when the end of the line, for this length and this orientation of the boom, is facing the receptacle and ready for coupling to be initiated.

This reference model contains a reference shape and a reference relative position. The shape-recognition information therefore makes it possible to establish, within a distance-measuring block 62, a distance measurement in two dimensions that represents the difference in position in the plane of the image between the recognized contour and the reference model.

The distance-measuring block 62 quantifies these differences in position and also uses information concerning the relationship between the dimensions of the recognized contour and those of the reference model in order therefrom to deduce a measurement of the distance along the depth axis.

The distance measurement signals thus produced are used in a servomotor control block 64. This block essentially contains a computer which formulates the response of the servocontrols for steering the boom according to a guidance law. This guidance law takes the detected distances into account in order to orientate the boom to the right, to the left, upwards or downwards, and to control the deploying of the line in such a way as to bring the detected shape closer by iteration to the theoretical model that corresponds to the current position of the boom and to current deployment of the line. The control law takes account of the condition of the control surfaces and of the servomotors. :t is based on the mechanical and elastic characteristics of the boom/line assembly and on the control surface flight mechanics.

The control signals originating from the block 64 are applied to the servomotors that orientate the flaps of the ailerons 18 of the boom 14, and to the servomotors which deploy the telescopic line. They make it possible, through successive iteration, to make the connection between the end of the line and the receptacle of the receiver aircraft.

Provision is preferably made that the system should operate in two phases: a lock-on phase, in which the preprocessing, contour extraction and shape-recognition operations are performed in the entire image,; and then, a phase of tracking the following images, in which these operations are performed only within a smaller operating window. The size and position of this window in the image are determined according to the following process.

In the image "n", the characteristic parameters associated with the receptacle (particularly, the position in the image and the size) are calculated using the successive operations described above. From this, the response of the servomotors, for the control surfaces of the boom and for deploying the line, are deduced. Using Kalman filtering, the position and size of the characteristic elements, at the next instant in the image "n+1", are estimated. Adopting a margin in order to take account of any turbulence, any actions by the pilots on the control surfaces of the aircraft or modeling errors, the position and size of the operating windows in the image "n=1" are deduced.

By reducing the size of the operating window, the computation time is shortened and the operating frequency of our system is increased. The fact of working with smaller windows also allows the use of other recognition techniques, such as recognition by correlation, the precision of which is better than one pixel.

This technique of tracking the characteristic elements of the image also makes it possible to predict events where these elements are no longer detectable, either because they are hidden by another object in the scene (the line, for example) or because they have left the field of view of the camera, or even because they do not lie in the operating window. In this case, the tracking of the successive positions within the image of the characteristic elements at the previous instants makes it possible to establish an optimum strategy for Locking back onto these elements.

When the desired final position has been reached, the calculator may initiate the coupling automatically, by ordering an additional deployment by a few centimeters or tens of centimeters allowing the line to lock in the receptacle, or alternatively it may simply give an authorization signal, initiation being performed by an operator who checks that everything is in order. It will be noted that the image produced by the camera may be transmitted to the flight deck of the tanker aircraft and that the operations are then monitored from the flight deck rather than from a special-purpose station at the rear of the aircraft.

The present invention allows the use of a camera of simple design which is sensitive in the visible or infrared spectra. For refuelling by night or in conditions of poor visibility, the use of a source of illumination may prove necessary.

Although the present invention allows the use of just one camera, it does not preclude the envisaged use of two cameras for reasons of redundancy, or to restrict the event of the characteristic elements being lost during tracking (by being concealed by the line, for example). In this case, if the mark ceases to be recognized by the computer because it is fully or partly hidden by the line, the second camera, which is slightly offset, will automatically take over and continue to provide automatic control. The system can also be supplemented by a camera mounted on the tanker aircraft, which allows the operator to have an overall view of the refuelling scene so that he can check the operation of the automatic control function.

What is claimed is:

1. A coupling system for in-flight refuelling, using means for automatically guiding a first end of a telescopic line towards a coupling receptacle to couple said telescopic line and said coupling receptacle, said telescopic line being deployable from a first end of an orientable boom, said system comprising:

a camera mounted on said first end of said orientable boom and providing an image in a form of an electronic signal;

shape-recognition means coupled to said camera for recognizing, in said image provided by said camera, characteristic elements associated with said coupling receptacle;

position-calculation means for calculating a difference between a position of characteristic elements of said image provided by said camera at a given instant and a reference position originating from a virtual image, stored in memory, of said telescopic line and said coupling receptacle, when said telescopic line and said coupling receptacle are coupled;

means for deducing, from an actual size of said coupling receptacle, and from a size and a position of said characteristic elements in said image, a depth-wise distance between said first end of said orientable boom and said coupling receptacle; and means for controlling an orientation of said orientable boom and deploying said telescopic line based on said difference, so that said telescopic line is brought closer to said coupling receptacle by iteration until said difference has been canceled.

2. The coupling system according to claim 1, wherein said reference position is a position of said characteristic elements of said image provided by said camera, when said telescopic line is in a final position for allowing coupling to said coupling receptacle.

3. The coupling system according to claim 2, wherein said shape-recognition means includes a database containing predetermined characteristic images corresponding to various receptacles and characteristic markings on an aircraft likely to be refueled.

4. The coupling system according to claim 3, wherein said shape-recognition means includes means for defining a reference position that can vary over time, starting from said predetermined characteristic images, of a current orientation of said orientable boom and of a current length of said telescopic line that has been deployed.

* * * * *

UNITED STATES PATENT AND TRADEMARK OFFICE
CERTIFICATE OF CORRECTION

PATENT NO.    : 6,324,295 B1
DATED         : November 27, 2001
INVENTOR(S)   : Valery et al.

It is certified that error appears in the above-identified patent and that said Letters Patent is hereby corrected as shown below:

Title page, Item 54, Column 1,
The title of Invention should read:
-- [54] GUIDING METHOD AND DEVICE FOR IN-FLIGHT REFUELLING LINE --

Item [73], the Assignee information should read:
-- [73] Assignees: Sextant Avionique, Velizy Villacoublay;
Institut National Polytechnique de Grenoble, Grenoble, both of (FR) --

Signed and Sealed this

Twelfth Day of March, 2002

*Attest:*

*Attesting Officer*

JAMES E. ROGAN
*Director of the United States Patent and Trademark Office*